United States Patent
Linner

(10) Patent No.: US 6,574,946 B1
(45) Date of Patent: Jun. 10, 2003

(54) METHOD AND DEVICE FOR END CLOSURE OF PACKAGING TUBES

(75) Inventor: Hans Linner, Kalmar (SE)

(73) Assignee: Norden Pac Development AB (SE)

( * ) Notice: Subject to any disclaimer, the term of this patent is extended or adjusted under 35 U.S.C. 154(b) by 0 days.

(21) Appl. No.: 09/555,434

(22) PCT Filed: Dec. 3, 1998

(86) PCT No.: PCT/SE98/02211

§ 371 (c)(1),
(2), (4) Date: Jul. 14, 2000

(87) PCT Pub. No.: WO99/29572

PCT Pub. Date: Jun. 17, 1999

(30) Foreign Application Priority Data

Dec. 5, 1997 (SE) .............................................. 9704525
Dec. 5, 1997 (SE) .............................................. 9704526

(51) Int. Cl.⁷ .............................................. B65B 7/14
(52) U.S. Cl. ............................ 53/479; 53/167; 53/237; 53/371.8; 53/375.4; 53/481; 53/567
(58) Field of Search ................... 53/167, 237, 371.8, 53/375.4, 459, 469, 474, 477, 479, 481, 567, 578

(56) References Cited

U.S. PATENT DOCUMENTS

| | | | |
|---|---|---|---|
| 5,600,933 A | * 2/1997 | Wiles et al. | 222/107 |
| 5,714,023 A | * 2/1998 | Redfern | 156/69 |
| 5,775,386 A | * 7/1998 | Connan | 141/100 |
| 5,782,384 A | * 7/1998 | Mejia Mustafa et al. | 222/129 |
| RE36,035 E | * 1/1999 | Usen et al. | 53/469 |
| 6,065,643 A | * 5/2000 | Harvey et al. | 222/94 |
| 6,185,911 B1 | * 2/2001 | Hahnel et al. | 53/237 |

FOREIGN PATENT DOCUMENTS

| | | |
|---|---|---|
| EP | 667285 A1 | 8/1995 |
| WO | WO 89/08544 | 9/1989 |
| WO | WO 94/19251 | 9/1994 |
| WO | WO 97/00208 | 1/1997 |
| WO | WO 98/54054 | 12/1998 |

* cited by examiner

Primary Examiner—John Sipos
Assistant Examiner—Hemant M. Desai
(74) Attorney, Agent, or Firm—Lerner, David, Littenberg, Krumholz & Mentlik, LLP

(57) ABSTRACT

A method and apparatus for the end closure of packaging tubes is provided. In one embodiment, the tube which is to be sealed presents an intermediate wall having a surplus length across the tube cross-section, and the intermediate wall is fixed at the filling end of the tube to the tube wall and along two joining locations extending along the length of the tube.

A hot air nozzle with two sub-members forming a gap therebetween is inserted into the opening in the filling end, and parts of the intermediate wall and the inside of the tube intended for sealing are heat activated in a non-contacting manner.

Apparatus for producing a clamping action is pressed against the heat activated tube end and the intermediate wall. This apparatus includes a pair of clamping jaws arranged for translatory motion perpendicular to the tube axis and initially in a direction at an angle to a line through the joining locations.

6 Claims, 5 Drawing Sheets

METHOD AND DEVICE FOR END CLOSURE OF PACKAGING TUBES

FIELD OF THE INVENTION

The present invention relates to packaging tubes of the so-called flexible type, i.e., tubes with a tube body manufactured from material which allows the body to be squeezed for emptying the packaging contents. More precisely,, the present invention relates to flexible packaging tubes with an intermediate wall which forms two product-receiving compartments in the tube, the compartments being separated from one another.

Such packaging tubes are used for allowing the containment of different product types as well as for delivering a mixture of the products which is obtained in-situ.

The present invention is intended to provide a method and apparatus for end closure of such intermediate wall tubes, as distinguished from so called twin tubes (see for instance applicant's own International Application No. WO 94119251).

BACKGROUND OF THE INVENTION

Tubes with intermediate walls are manufactured, inter alia, by starting from web-like flexible material, e.g., polyethylene, polypropylene or other thermoplastic materials, in a longitudinal direction, by joining, along a pair of welded seams, a material layer serving as an outer tube wall to a material layer serving as an intermediate wall, which intermediate wall material layer is normally thinner than the outer material layer. The width of the outer material web is thereby larger than the width of the material web which is intended to form the intermediate wall, and the relationship between the widths is often chosen so that after longitudinal sealing of the outer layer and forming this into a circular tube, the intermediate wall presents a length over the cross-section of the tube which exceeds the diameter of the tube. The length of the intermediate wall is often chosen so that it corresponds to half the circumference of the tube, which means that with so-called planar sealing of the filling end of the tube, the intermediate wall presents the same length as the flattened tube end during sealing, as well as afterwards.

It has, however, shown itself to be the case that this surplus of length in the intermediate wall, which can be advantageous in the ready-sealed tube end, results in difficulties, even at the filling stage.

In order to overcome this, the applicant previously produced a method and device (WO 98/54054, priority date May 27, 1997), which allows the introduction of the filling nozzle on respective sides of the intermediate wall. Two relatively well-defined spaces in the closure end of the packaging tube are thereby created by the intermediate wall being stretched and spot welded to the inside of the tube at two substantially diametrically opposed positions.

This spot welding is done in a filling machine and, for continued efficient handling in the machine after filling with product/products, the filling end of the tube with corresponding end of the intermediate wall has to be capable of being sealed in a rational manner to form an end closure.

Tubes with intermediate walls are also manufactured by injection molding, in one-piece, a tube body, breast and intermediate wall.

Due to this manufacturing method, the intermediate wall in this case is of a thicker material as compared to the first-mentioned type of intermediate wall tube.

The greater material thickness results in problems with sealing the tube end.

In order to achieve such sealing, the intermediate wall has been allowed to finish at a distance from the tube end. With the aid of contacting heated jaws, heat energy from the outside of the tube is supplied to the inside of the tube in an encircling end area of the tube at a level above the intermediate wall.

Thus, in the tube filling machine, directly after the heat-activation station following the embossing station, embossing jaws operating perpendicularly to the intermediate wall during the entire sealing process have been used to press the ends of the tube together in the encircling end area in order to thereby create a seal.

However, such a seal does not always ensure the production of a joint which is free of passages between the two product containing compartments, which the intermediate wall is intended to achieve.

One object of the present invention is to solve the problem of end closure of packaging tubes of the types mentioned above, and to provide a solution which, while maintaining productivity in a tube filling machine, provides a complete handling of intermediate wall tubes, in principle in a manner which is equal to the highly effective handling of conventional tubes.

The solution to these problems should furthermore be such that a minimum of disturbance is required in existing tube filling lines.

SUMMARY OF THE INVENTION

In accordance with the present invention, these and other objects have now been realized by the discovery of a method for the end closure of a packaging tube including a tube body having a filling end and an intermediate wall forming a pair of separated product-receiving compartments, the intermediate wall extending across the tube body substantially along the entire length of the tube body along a first pair of circumferentially spaced joining locations, and a second pair of circumferentially spaced joining locations at the filling end of the tube body, whereby predetermined portions of the intermediate wall are formed between each of the second pair of circumferentially spaced joining locations and each of the first pair of circumferentially spaced joining locations, the method comprising heat activating the intermediate wall and the inside of the tube body by inserting a hot air nozzle including a pair of sub-members forming a gap therebetween into the area of the filling end of the tube body without direct contact with the packaging tube while applying a forming tool externally to the filling end of the tube body whereby the cross-sectional dimension of the filling end is compressed in both the horizontal and vertical directions, the intermediate wall is maintained in a stretched condition in the filling end of the tube body and both of the predetermined portions of the intermediate wall are brought closer to the inside of the tube body than before application of the forming tool, subsequently removing the hot air nozzle, and clamping the packaging tube so as to seal the filling end of the tube body.

In accordance with one embodiment of the method of the present invention, the tube body comprises a substantially elliptical shape and the intermediate wall is stretched across a minor axis of the filling end of the tube body, and wherein the applying of the forming tool externally to the filling of the tube body provides a cross-sectional dimension of the tube end having a substantially right-angled, four-sided shape. In a preferred embodiment, the pair of sub-members of the hot air nozzle comprise a pair of substantially identical sub-members defining substantially a right-angled cross-sectional dimension forming the gap adapted to receive the intermediate wall.

In accordance with another embodiment of the method of the present invention, the method includes inserting the hot air nozzle into the area of the filling end of the tube body so that the concentration of heat energy obtained on the intermediate wall is provided at portions of the intermediate wall between the first and second pairs of circumferentially spaced joining locations.

In accordance with the present invention, apparatus has also been discovered for the end closure of a packaging tube including a tube body having a filling end and an intermediate wall forming a pair of separated product-receiving compartments, the intermediate wall extending across the tube body substantially along the entire length of the tube body along a first pair of circumferentially spaced joining locations and a second pair of circumferentially spaced joining locations at the filling end of the tube body, whereby predetermined portions of the intermediate wall are formed between each of the second pair of circumferentially spaced joining locations and each of the first pair of circumferentially spaced joining locations, the apparatus comprising a hot air nozzle including a pair of sub-members forming a gap therebetween for accommodating the intermediate wall, the pair of sub-members including hot air delivery openings in the gap and outside of the gap, the hot air nozzle being dimensioned for insertion into the filling end of the tube body without directly contacting the packaging tube whereby the tube body including the intermediate wall at the filling end can be heat activated, clamping means for clamping and sealing the heat activated regions of the tube body, and a forming tool for external application to the filling end of the tube body during the heat activation to compress the filling end in both the horizontal and vertical directions, to maintain the intermediate wall in a stretched condition in the filling end of the tube body, and to bring both of the predetermined portions of the intermediate wall closer to the inside of the tube body than before application of the forming tool. In a preferred embodiment, the forming tool includes cooling means, the forming tool including an inner surface providing a substantially four-sided forming opening for application to the filling end of the tube body.

The solution to the problem underlying the present invention, when dealing with packaging tubes of the above-mentioned type, is found by the realization that it is possible, in the present connection of material wall thicknesses of a highly varying degree and material of different types, as well as with addition of material layers in different areas of the produced sealing area, with the method and apparatus described above to heat-activate the complicated material composite or geometry, respectively, so that acceptable heat sealing is obtained in all areas of the produced end closure, also including any areas with double-layered intermediate walls and areas with up to and including triple intermediate walls.

The solution to the problems underlying the present invention, when dealing with the packaging tubes of the second type mentioned, is found by the realization that it is possible, in the present connection of material wall thicknesses achievable by injection molding and with the intermediate wall finishing at the level of the tube end or at a distance from it, with the method and apparatus, respectively, to heat-activate and thereafter press together the complicated material geometry so that acceptable heat sealing is obtained in all areas of the end closure which is created, including also any areas where the intermediate wall is present.

DETAILED DESCRIPTION

Figure 1:
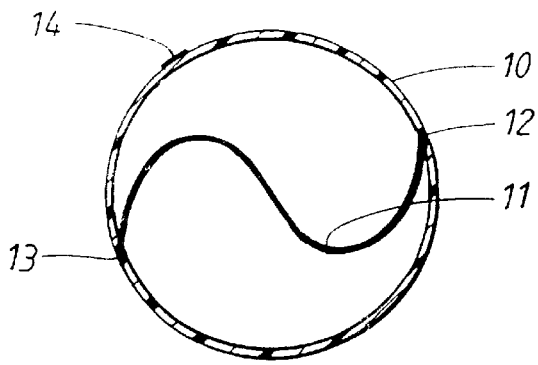
FIG. 1 is a top, elevational, partially schematic, cross-sectional view of an intermediate wall tube as it appears after manufacture.

The tube 10 schematically shown in FIG. 1 from the filling end includes in a traditional manner an end (not shown) comprising a tube breast provided with an emptying orifice, and in the embodiment shown being manufactured from a flat blank and by means of longitudinal sealing 14 being given a substantially circular cross-section. Depending on the type of material of the tube body, where the material can be a monomer material of any suitable polyolefin, e.g., polyethylene, polypropylene, etc., or a laminate of plastic material with barrier properties or metal foil or alternatively metallized film, the cross-section will have more or less a predefined shape. Additionally, the damage or effects that are caused by the conveyance of the tubes will effect the cross-section that finally ends up in the tube filling machine.

In the tube body 10 there is an intermediate wall 11 which is joined to the planar tube body blank or tube body, respectively, by longitudinal seals, 12 and 13. The material of the intermediate wall 11 in the embodiment shown is of a material type which is heat sealable to the tube blank or the inside of the tube body, e.g., the material type may be identical to the material of the tube body 10, or its inner layer, if the tube body 10 is formed of a laminate.

The intermediate wall 11 has a surplus of length which means that within the tube body 10 it describes approximately the curve which is shown in FIG. 1. The length often corresponds to half the circumference of the tube body 10, with the intention that when the tube filling end is in a flattened condition, opposing sections of the tube body and intermediate wall will present the same diametrical length.

Figure 2:
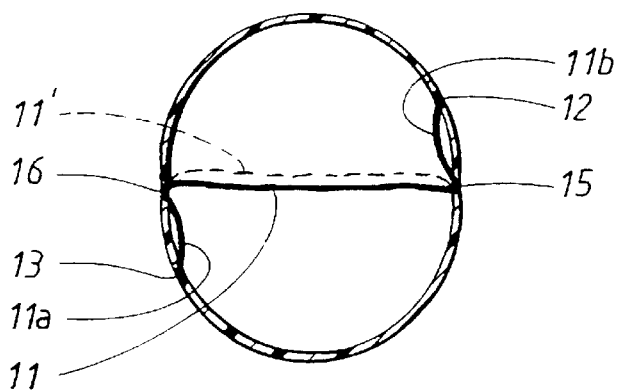
FIG. 2 is a top, elevational, partially schematic, cross-sectional view of the tube of FIG. 1 with the intermediate wall fixed to the tube at a pair of additional connections points.

As mentioned in the introduction, the surplus length of the intermediate wall results in problems of introducing the filling nozzle into the filling end, such that in reality one has often resorted to stretching the intermediate wall 11 in the area of the filling opening in accordance with that shown in FIG. 2. The intermediate wall 11 has, in that case, been spot welded to the tube body wall adjacent the upper edge of the filling opening, or at a short distance therefrom, while the connections, 12 and 13, still join the intermediate wall along the entire length of the tube body up into its tube breast and into the emptying orifice. By stretching the intermediate wall lithe cross-section in FIG. 1 will be changed. The change in shape which occurs depends to a large extent on the elasticity of the tube body material. Due to the spot welding of the intermediate wall, the cross-sectional shape will normally assume an oval or elliptical form in accordance with FIG. 2. The intermediate wall 11 can be more or less stretched depending on the elasticity of the tube body material, and the dashed line 11' depicts a case with deformed cross-section but with a slack intermediate wall 11'. The connections, 15 and 16, or the intermediate wall give rise to material portions, 11a and 11b, between respective spot welds, 15 and 16, and the adjacent connection locations, 12 and 13, at the tube wall. In practice it is difficult to lay these material portions, 11a and 11b, closely against the inside of the tube wall, especially since the material properties of the tube wall can present a return action tendency back to the original form of FIG. 1, while the material in the thinner intermediate wall 11 does not have a corresponding tendency. The result is that between the intermediate wall portions, 11a and 11b, and the inside of the tube wall there will be a space which makes uniform heat-activation of the intermediate wall and the inside of the tube wall difficult. Moreover, as already mentioned, in certain applications the stretching of the intermediate wall 11 can be insufficient for creating a well-defined geometry for heat activation, which can additionally complicate the situation.

In such application use is made of a re-forming step, where a forming tool 17 with a forming opening 18 with a substantially right-angled four-sided shape is applied to the outside of the tube body at the filling end. By dimensioning this opening 18 in such a way that the opening deforms, i.e., presses together, the cross-sectional dimension of the tube end in FIG. 2 in both the horizontal and vertical directions, the sections, 11a and 11b, will be brought closer to the inside of the tube body and the intermediate wall 11 will be tightened into a stretched condition.

Figure 3:
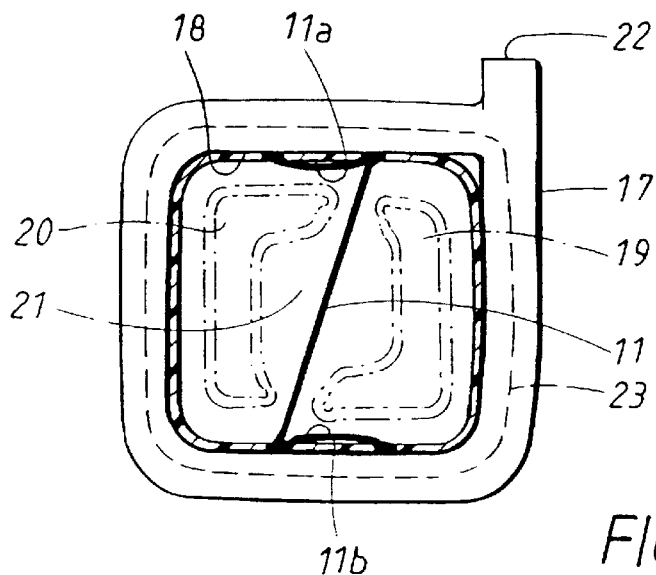
FIG. 3 is a top, elevational, partially schematic, cross-sectional view of the tube shown in FIG. 2, re-formed with a forming tool and with the tube in a position for heat activation of those surfaces of the tube material which are to be sealed together in a later stage.

FIG. 3 shows such a condition. The dashed lines, 19 and 20, show a pair of non-contactingly operating sub members, 19 and 20, or a hot air nozzle for heat activation of those areas of the intermediate wall and the inside of the tube which will later be put together as a tube end seal.

From the Figure it is clear that the cross-section of these sub-members together form a substantially right-angled four-sided shape and that this right-angled quadrilateral (in the plane of the forming tool) has about the same orientation as the quadrilateral which is formed by the tube body end in the forming tool 17. By means of this well-defined mutual orientation between the sub-members of the nozzle and the tube cross-section, it is possible to empirically determine a heat activation suitable for end closure of the mentioned different sections of the intermediate wall and the tube end which is to be sealed for forming the end closure. Moreover, it is possible to vary the distance as well as the hot air release from activation location to activation location for the non-contacting heat activation, whereby the heat transfer in e.g., the positions, 11a and 11b, for double material layers (the intermediate wall and the tube wall in FIG. 3) can be intensified by reducing the distance and/or increasing the release of hot air.

With a gap 21 between the sub-elements, 19 and 20, it is possible (also empirically) to control the heat transfer to both sides of the intermediate wall 11.

The forming tool 17 also serves to externally control temperature conditions of the tube body at its sealing end, by the tool being connected to a cooling medium inlet 22 for circulation of a cooling medium, e.g., water, through an encircling channel 23.

Figure 9:
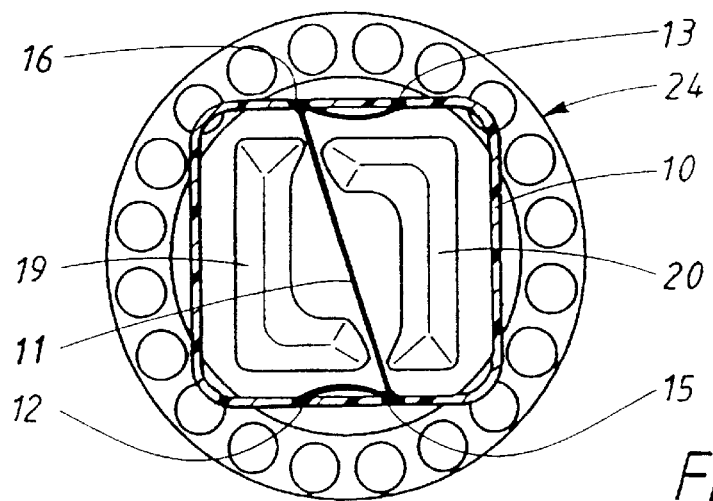
FIG. 9 is a bottom view of a second embodiment of a divided nozzle of the present invention with modified tube cross-section schematically added.
Figure 10:
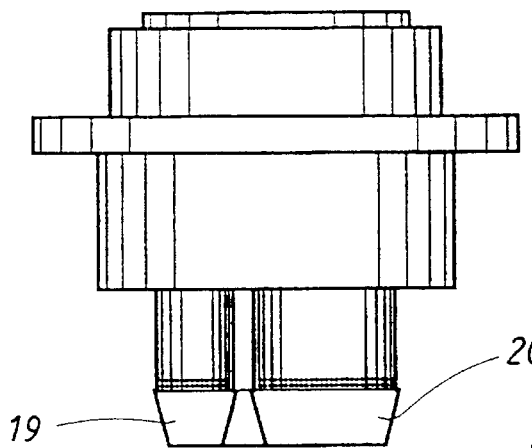
FIG. 10 is a side view of the nozzle shown in FIG. 9.
Figure 11:
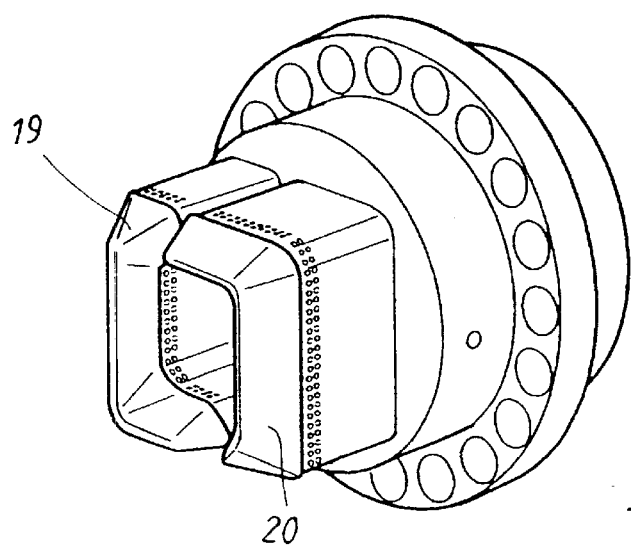
FIG. 11 is a side view of the nozzle shown in FIG. 9.

The forming tool 17 and the hot air nozzle 24 comprising the sub-members, 19 and 20, is arranged in a heat activation station (not shown) in the tube filling machine. Filled tubes are then intermittently fed to this station, and the filling end of a tube present in the station is contacted by the forming tool 17 and after re-forming the hot air nozzle's sub-members, 19 and 20, will be located in the position which is depicted in FIG. 3 and which is also shown in FIG. 9.

Figure 4A:
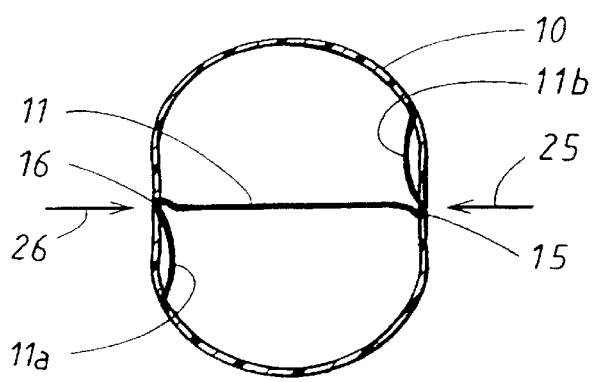
FIG. 4a is a top, elevational, partially schematic, cross-sectional view of the tube taken out of the forming tool in FIG. 3 and, shown with arrows, a possible compressing direction in the station in the filling machine where the closure is formed.
Figure 4B:
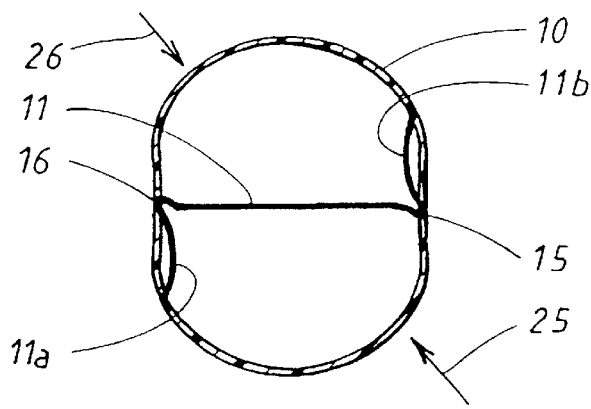
FIG. 4b is a top, elevational, partially schematic, cross-sectional view of a second preferred compressing direction for the heat-activatable filling end of the tube.

After heat activation is carried out according to FIG. 3, the tube is released from the heat activation station and is conveyed further to a clamping jaw station where its clamping jaws (embossing jaws) achieve clamping of the tube end in accordance with the arrows, 25 and 26 (FIGS. 4a, 4b).

Figure 5A:
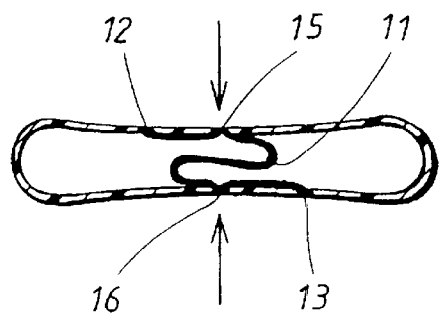
FIG. 5a is a top, elevational, partially schematic, cross-sectional view of the tube and the intermediate wall during clamping according to FIG. 4a, showing the material composition and geometry which is present.

As is clear from FIG. 5a, the intermediate wall 11 in this embodiment is laid together to form a total of three layers, where also the outer layer is to be put together with the inside of the tube, where the outer layer is also to be put together with the inside of the tube wall. It is thus essential that the heat activation produced according to FIG. 3 achieves sufficient heat activation for acceptable heat sealing in all sections.

Figure 5B:
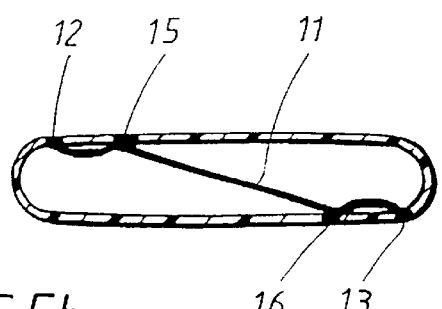
FIG. 5b is a top, elevational, partially schematic, cross-sectional view of the tube and the intermediate wall during compression according to FIG. 4b.

In the embodiment according to FIG. 5b the build up of layers is easier to handle from a sealing point of view. The intermediate wall here lies as a single layer in the area of the tube end.

With the described embodiment of the hot air nozzle and the forming tool, the conditions for sufficient heat activation are determined empirically.

Figure 6:
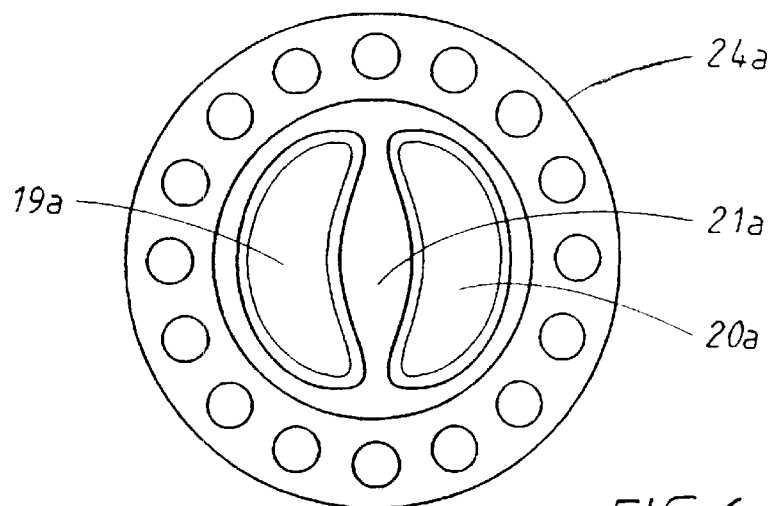
FIG. 6 is a bottom, elevational view of a first embodiment of two sub-members forming a hot air nozzle according to the present invention.
Figure 7:
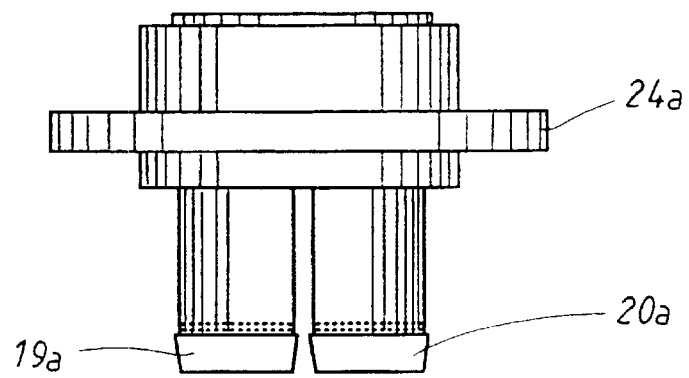
FIG. 7 is a side, elevational view of the nozzle shown in FIG. 6.
Figure 8:
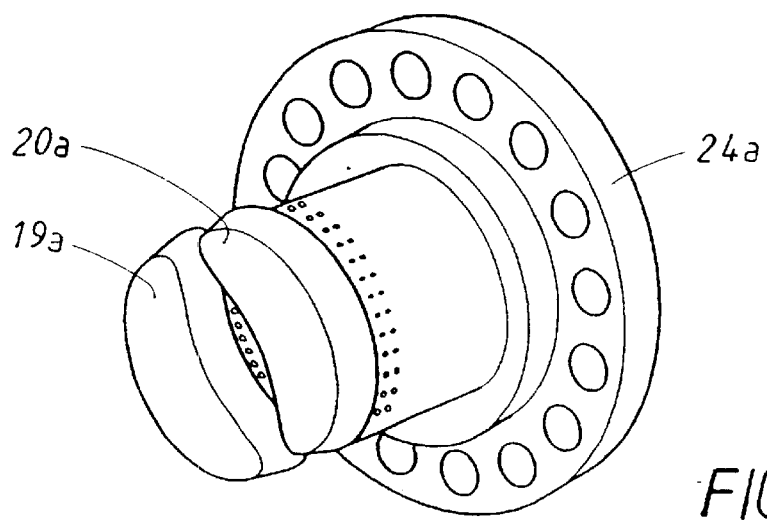
FIG. 8 is a side, perspective view of the nozzle shown in FIG. 6.

In certain applications where the conditions are favorable, especially concerning the material of the intermediate wall and the tube body, it is possible to omit the re-forming step and to use a hot air nozzle design of FIGS. 6–8. In this special case, there is still a gap 21a intended to receive the intermediate wall 11, and the sub-members, 19a and 20a, are so designed that non-contacting heat activation is possible. Even in this latter case, the design of gap 21a as well as the outer contour of the sub-members 19a, 20a is determined in an empirical manner.

So far the present invention has been described in connection with a specific embodiment of a packaging tube. However, as mentioned in the introduction, it is understood that the present invention may also be applied in other areas, for example in applications where the tube and intermediate wall are manufactured in one piece by injection molding or in a similar manner.

Figure 12:
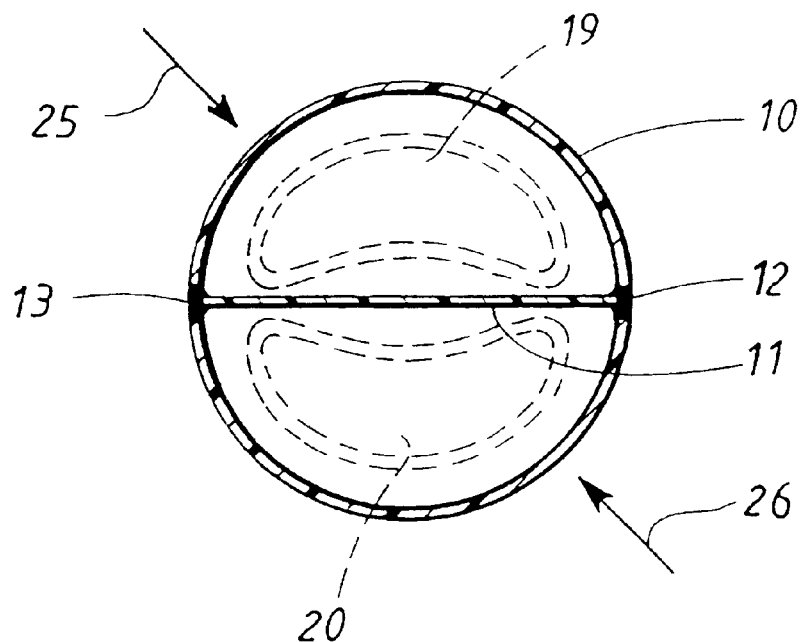
FIG. 12 Is a top, elevational, partially schematic, cross-sectional view of an intermediate wall tube, injection molded in one piece (with the tube breast not shown)

The tube 10, schematically shown in FIG. 12 from the filling end, includes in a traditional manner an end (not shown) comprising a tube breast provided with an emptying orifice, and in the embodiment shown being manufactured by injection molding and being given a substantially circular cross-section.

In the tube body 10 there is an intermediate wall 11 which is formed as one piece with the tube body by injection molding and is connected to this at connection locations, 12 and 13. The intermediate wall extends into the tube breast and there delimits two separate delivery passages all the way up to the emptying ends. At the other end of the tube body, the intermediate wall extends into the end edge of the tube body or finishes at a particular, predetermined distance from this end edge.

FIG. 12 indicates in dashed lines, 19 and 20, a pair of non-contactingly operating sub-members, 19 and 20, of a hot air nozzle for heat activation of those areas of the intermediate wall and of the inside of the tube which are later to be put together to form a tube end seal.

From this figure it is clear that the cross-section of these sub-members substantially corresponds to the cross-section of the sub-compartments of the tube formed by the intermediate wall. By means of this well-defined form of the sub-members and the respective orientation between the sub-members of the nozzle and the tube cross-section, an empirically determinable heat activation suitable for end sealing of the sections of the intermediate wall and the tube ends which are to be sealed for forming the end closure is made possible. By means of the form and the placement of openings for hot air release, it is possible to vary the distance as well as the hot air release from activation location to activation location for the contactless heat activation.

With a gap 21 between the sub-members, 19 and 20, the heat transfer to both sides of the intermediate wall 11 can (also empirically) be controlled.

The hot air nozzle 24, including the sub-members, 19 and 20, is arranged in a heat activation station (not shown) in a tube filling machine. Filled tubes are thereby fed intermittently to this station, and in this position a filling end of a tube present in the station is heat activated by the sub-members 19, 20 of the hot air nozzle, as shown in FIG. 12.

After heat activation has been performed according to FIG. 12, the tube is removed from the heat activation station and transported further to a clamping jaw station where its clamping jaws (embossing jaws) achieve a squashing of the tube end in accordance with the arrows, 25 and 26.

As shown by these arrows, the clamping jaws or embossing jaws act against the outside of the tube body and perform a movement by which the tube body is pressed by a pair of opposed jaws, which after pressing against the tube body perform opposed translatory movement in a plane perpendicular to the longitudinal axis of the tube, in the direction of arrows, 25 and 26, i.e., initially in a direction at an angle to the extension of the intermediate wall.

By means of this initial "angled" pressing, the circular cross-section is progressively changed (step 2) to a planar seal with the intermediate wall included in the seal or (depending on the extent of the intermediate wall in the longitudinal direction of the tube) with its upper edge directly merging into this, in order to separate, without any passages, the two compartments which are formed by the intermediate wall.

Figure 13:
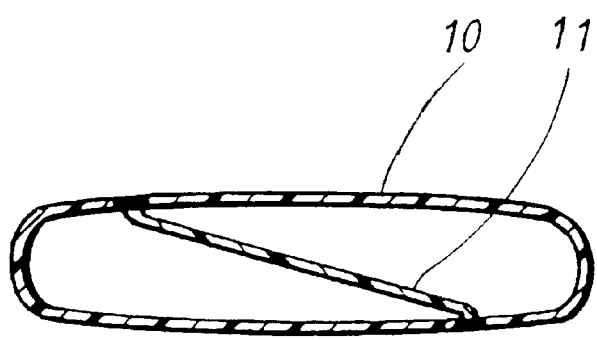
FIG. 13 is a top, elevational, partially schematic, cross-sectional view of the tube and the intermediate wall, while being clamped together according to FIG. 12.

The initial pressing of the embossing or clamping jaws thus allows the intermediate form shown in FIG. 13 to be laid flat in the final stage, with the intermediate wall securely positioned within the end seal or in direct connection in a passage-free manner relative to this.

Although the present invention has been described in connection with specific embodiments of packaging tubes, it is understood that the present invention may also be applied in other areas, for example, where an intermediate wall does not extend in a straight line across the tube cross-section, but instead in an 5-formed manner, for example. For this, the sub-members of the nozzle are given a corresponding cross-section and the initial pressing direction for the clamping jaws is thereby defined in relation to an imaginary straight joining line between the connection locations with the tube body.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for the end closure of a packaging tube including a tube body having a filling end and an intermediate wall forming a pair of separated product-receiving compartments, said intermediate wall extending across said tube body substantially along the entire length of said tube body along a first pair of circumferentially spaced joining locations, and a second pair of circumferentially spaced joining locations at said filling end of said tube body, whereby predetermined portions of said intermediate wall are formed between each of said second pair of circumferentially spaced joining locations and each of said first pair of circumferentially spaced joining locations, said method comprising heat activating said intermediate wall and the inside of said tube body by inserting a hot air nozzle including a pair of sub-members forming a gap therebetween into said area of said filling end of said tube body without direct contact with said packaging tube while applying a forming tool externally to said filling end of said tube body whereby the cross-sectional dimension of said filling end is compressed in both the horizontal and vertical directions, said intermediate wall is maintained in a stretched condition in said filling end of said tube body and both of said predetermined portions of said intermediate wall are brought closer to the inside of said tube body than before application of said forming tool, subsequently removing said hot air nozzle, and clamping said packaging tube so as to seal said filling end of said tube body.

2. The method according to claim 1 wherein said tube body comprises a substantially elliptical shape and said intermediate wall is stretched across a minor axis of said filling end of said tube body, and wherein said applying of said forming tool externally to said filling of said tube body provides a cross-sectional dimension of said tube end having a substantially right-angled, four-sided shape.

3. The method according to claim 2 wherein said pair of sub-members of said hot air nozzle comprise a pair of substantially identical sub-members defining substantially a right-angled cross-sectional dimension forming said gap adapted to receive said intermediate wall.

4. The method according to claim 3 including inserting said hot air nozzle into said area of said filling end of said tube body so that the concentration of heat energy obtained on said intermediate wall is provided at portions of said intermediate wall between said first and second pairs of circumferentially spaced joining locations.

5. Apparatus for the end closure of a packaging tube including a tube body having a filling end and an intermediate wall forming a pair of separated product-receiving compartments, said intermediate wall extending across said tube body substantially along the entire length of said tube body along a first pair of circumferentially spaced joining locations and a second pair of circumferentially spaced joining locations at said filling end of said tube body, whereby predetermined portions of said intermediate wall are formed between each of said second pair of cumferentially spaced joining locations and each of said first pair of circumferentially spaced joining locations, said apparatus comprising a hot air nozzle including a pair of sub-members forming a gap therebetween for accommodating said intermediate wall, said pair of sub-members including hot air delivery openings in said gap and outside of said gap, said hot air nozzle being dimensioned for insertion into said filling end of said tube body without directly contacting said packaging tube whereby said tube body including said intermediate wall at said filling end can be heat activated, clamping means for clamping and sealing said heat activated regions of said tube body, and a forming tool for external application to said filling end of said tube body during said heat activation to compress said filling end in both the horizontal and vertical directions, to maintain the intermediate wall in a stretched condition in said filling end of said tube body, and to bring both of said predetermined portions of said intermediate wall closer to the inside of said tube body than before application of said forming tool.

6. The apparatus of claim 5, wherein said forming tool includes cooling means, said forming tool including an inner surface providing a substantially four-sided forming opening for application to said filling end of said tube body.

* * * * *

UNITED STATES PATENT AND TRADEMARK OFFICE
CERTIFICATE OF CORRECTION

PATENT NO. : 6,574,946 B1
DATED : June 10, 2003
INVENTOR(S) : Hans Linner

It is certified that error appears in the above-identified patent and that said Letters Patent is hereby corrected as shown below:

<u>Title page, Item [54] and Column 1, lines 1 and 2,</u>
Title, "DEVICE" should read -- APPARATUS --; and
"PACKAGING" should read -- PACKAGE --.

<u>Column 1,</u>
Line 9, cancel "," (second occurrence).

Signed and Sealed this

Sixteenth Day of September, 2003

JAMES E. ROGAN
*Director of the United States Patent and Trademark Office*